US006133356A

United States Patent [19]

Wong

[11] Patent Number: 6,133,356

[45] **Date of Patent: *Oct. 17, 2000**

[54] GRAFT COPOLYMERIZED COMPOSITIONS

[75] Inventor: Pui Kwan Wong, Houston, Tex.

[73] Assignee: Shell Oil Company, Houston, Tex.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/988,488

[22] Filed: Dec. 10, 1997

Related U.S. Application Data

[60] Provisional application No. 60/034,141, Dec. 23, 1996.

[51] Int. Cl.$^{7}$ .......................... C09J 151/08; C09J 173/00; C08F 283/00

[52] U.S. Cl. .......................... 524/377; 524/376; 524/378; 524/457; 525/539

[58] Field of Search ............................ 525/539; 524/457, 524/376, 377, 378; 156/307.3, 327, 331.3

[56] References Cited

U.S. PATENT DOCUMENTS

| | | | |
|---|---|---|---|
| 3,472,918 | 10/1969 | Guillet et al. . | |
| 5,227,465 | 7/1993 | Drent | 525/539 |
| 5,684,080 | 11/1997 | van der Heide | 524/368 |
| 5,869,576 | 2/1999 | Ash . | |

FOREIGN PATENT DOCUMENTS

| | | |
|---|---|---|
| 266994 | 5/1988 | European Pat. Off. . |
| 95/24449 | 9/1995 | WIPO . |

OTHER PUBLICATIONS

Search Report dated Apr. 27, 1998.

*Primary Examiner*—David J. Buttner

[57] ABSTRACT

Relatively low molecular weight olefin/CO polymers are graft copolymerized. The graft copolymers provide the basis for waterborne adhesives that are particularly useful for making wood composites.

10 Claims, No Drawings

GRAFT COPOLYMERIZED COMPOSITIONS

This application claims the benefit of the filing of U.S. Provisional Patent Application 60/034,141 filed on Dec. 23, 1996.

FIELD OF THE INVENTION

This invention relates to resins made from monomers of olefins and carbon monoxide and their use as adhesives.

BACKGROUND

Polymers of carbon monoxide and olefins generally referred to as polyketones are well known in the art. The class of linear alternating polymers of carbon monoxide and at least one ethylenically unsaturated hydrocarbon are of particular interest among polyketone polymers. This class of polymers is disclosed in numerous U.S. patents assigned to Shell Oil Company, exemplified by U.S. Pat. Nos. 4,880,865 and 4,818,811 which are incorporated herein by reference. Polyketone polymers display a well balanced set of mechanical properties which make them particularly useful as engineering thermoplastics.

Other materials having useful properties have also been formed from the combination of various olefins and carbon monoxide. Among these, are relatively low molecular weight materials comprising oligomers or low molecular weight polymers. In this case, however, a monomer other than carbon monoxide and ethene comprises at least 20% wt of the total weight of the polymer. Two olefinic monomers are ordinarily used such as ethene and propene with a relatively high percentage of each (on a weight or molar basis) compared to the linear alternating aliphatic polyketones used as engineering thermoplastics. The monomeric mix will typically include about 50% mole (based on total weight of polymer) CO and about 50% mole of olefins with at least about 30% by weight of the total olefin content comprised of $C_3$ or higher olefins.

These oligomers or low molecular weight polymers can be employed as thermosets. Depending upon the composition and method of preparation, many will still advantageously exhibit many properties ordinarily associated with thermoplastics under a range of conditions. In such applications they are cured with a curing agent which is generally an amine. Curing may be achieved in the presence of an acid catalyst. Such resins are preferable to existing thermosets in a variety of applications due to reduced environmental nuisances, ease of use, and property mix.

One application of these thermosets is as an adhesive. More particularly, they are useful as glues for wood composites in the preparation of plywood and flake or particle board. To this point, the wood composite industry has generally used adhesives such as urea formaldehyde resins and phenol formaldehyde resins. However, many of the wood composites prepared with them are losing favor in important market segments even though the demand remains generally high for a high impact resistant wood composite with good dimensional stability in the presence of moisture. Much of this is attributable to environmental and safety factors associated with the systems.

Wood glue compositions based on neat olefin/CO resins and amine curing agents have been previously prepared. While these neat glue systems provide good adhesion, their viscosity and pot life are not ideal for many commercial applications. Lowering their viscosity and increasing their pot life would extend the range of applications for which olefin/CO resins could be used. In particular, they could be made much more suitable for use in the production of plywood and oriented strand board under such conditions.

SUMMARY OF THE INVENTION

In one aspect of this invention, olefin/CO copolymers are graft copolymerized with vinyl monomers. The graft copolymers are excellent glues, particularly in wood applications, and are cured by reaction with an amine curing agent in the presence of an acid catalyst. The graft copolymers are advantageously prepared as low molecular weight polymers.

In another aspect of this invention improved adhesives are prepared. These adhesives are particularly useful for binding wood and wood byproducts and are prepared based on a copolymer of carbon monoxide, olefinically unsaturated compounds, and a curing agent.

In another aspect of this invention a wood composite is presented. The composite comprises wood parts adhered to one another by means of a cured binder which is obtainable by curing a curable resin composition which contains a copolymer of carbon monoxide with an olefinically unsaturated compound and a curing agent.

DETAILED DESCRIPTION

Neat olefin/CO copolymer resins in combination with amine curing agents can be effectively used as wood glues. In the practice of this invention olefin/CO resins are improved through graft copolymerization. It has been found that converting the neat olefin/CO copolymer this way makes the system amenable to waterborne application, significantly lengthens potlife, and reduces the viscosity thereby significantly improving the workability of these systems. Furthermore, grafting the olefin/CO copolymers can significantly reduce the overall raw material cost of the glues since a major portion of the glue can be an inexpensive material such as styrene. The graft copolymer is preferably made by imbibing a vinyl monomer into the oil phase of a dispersion of olefin/CO copolymer. Grafting is achieved with the addition of a radical initiator.

Copolymers of carbon monoxide and an olefinically unsaturated compound are known. Preferably the copolymer contains 1,4-dicarbonyl entities in its polymer chain because this arrangement accommodates certain curing reactions as, for example, with poly-primary-amines described more fully below. Such olefin/CO copolymers can be prepared by palladium catalyzed polymerization using the methods known from, for example, EP-A-121965, EP-A-181014 and EP-A-516238 (the disclosures of which are incorporated herein by reference). The polymers so prepared may be linear alternating copolymers of carbon monoxide and the olefinically unsaturated compound(s). That is, the polymer chains contain the monomer units originating in carbon monoxide (i.e., carbonyl groups) and the monomer units originating in the olefinically unsaturated compound(s) in an alternating arrangement. Perfectly alternating copolymers of carbon monoxide and olefinically unsaturated compounds are preferred because these have a higher content of carbonyl groups in the polymer chain relative to random copolymers. This can contribute to the quality of the cure of resins made from these systems leading to a high level of crosslinking.

The copolymers of carbon monoxide and olefinically unsaturated compounds may be based on a hydrocarbon as the olefinically unsaturated compound, but the olefinically unsaturated compound may also contain a heteroatom provided that it is separated from the double bond by a spacer group. For example, comonomers such as 10-undecen-1-ol and 10-undecenoic acid can be used. It is preferred that the copolymer is based on an olefinically unsaturated hydrocarbon having up to 10 carbon atoms. Aliphatic α-olefins with 3 to 6 carbon atoms are particularly suitable in this capacity and include, for example, those having a straight carbon chain such as propene, 1-butene, 1-pentene and 1-hexene. Propene is the preferred monomer of this group. It is most preferred to use a combination of ethene and propene with propene comprising the primary monomer.

The molecular weight of the copolymer prior to grafting may vary between wide limits. Copolymer with a number average molecular weight in the range of from 200 to 20,000 can be used. However, copolymers having number average molecular weights between about 500 to 5000 are preferred. Molecular weights from 1000 to 4000 are most preferred. The copolymers typically have a molecular weight distribution, such that their Q value amounts to 1.1–5, more typically 1.5–3, the Q value being the quotient of the weight average molecular weight and the number average molecular weight. The relatively low molecular weight of the copolymer enables the resin systems of this invention to be used as a liquid at the temperatures generally used in processing and working with the copolymer. This is frequently in the range of 10–80° C., more frequently in the range of 20–60° C. The processing of the copolymer encompasses, for example, the preparation of the binder used in this invention and the application of the binder onto the wood surface.

Prior to grafting, the copolymer comprises about 50% mole CO and 50% mole olefin wherein the olefin content comprises between 0 and 70% wt ethene and between 30 and 100% wt propene. It is more preferred that the olefinic mix is between about 20 and 70% by weight ethene and 80 and 30% wt propene. It is most preferred that the olefinic mix is about 70% wt propene and 30% wt ethene.

Grafting can be conducted with any of the methods used to form graft copolymers. This includes exposure of an appropriate monomer and copolymer mix to high energy radiation, heating a suitable monomer in the presence of the copolymer, or reaction of a suitable monomer in the presence of a radical initiator and copolymer. Any other method for graft copolymerizing polymers will be useful in the practice of this invention.

Radical initiation is the most preferred method of preparing the graft polymerized copolymers of this invention. Suitable monomers used in forming grafts by this method include, for example, monoolefinic hydrocarbons such as the styrenes and their derivatives, monolefinically unsaturated esters such as vinyl acetate, vinyl esters of halogenated acids such as vinyl alpha-choroacetate, allyl and methallyl compounds such as allyl chloride, esters of alkenyl alcohols such as beta-ethyl allyl alcohol, halo-alkyl acrylates such as methyl alpha-chloroacrylate, alkyl alpha-cyanoacrylates, fumarates such as diethyl fumarate, monoolefinically unsaturated nitriles such as acrylonitrile, amides of previously mentioned acids such as acrylamide, alkyl ethers such as vinyl methyl ether, vinyl sulfides such as vinyl beta ethoxyethyl sulfide, diolefinically unsaturated hydrocarbons such as 1,3 butadiene, and mixtures of the forgoing compounds. Preferred monomers are styrenes, acrylates, methacrylates, vinyl esters, and vinyl halides. Styrenes are most preferred.

Radical initiators can be either water soluble or oil soluble. Water soluble radical initiators include, for example, potassium persulfate, ammonium peroxydisulfate, potassium peroxydisulfate, sodium persulfate, hydrogen peroxide, and water soluble azo initiators. Oil soluble radical initiators include, for example, benzoyl peroxide, t-butyl perbenzoate and 2,2'-azobis(isobutyronitrile). Water soluble initiators are preferred such as potassium persulfate or azo initiators. The concentration of the free radical initiator is about 0.01 to about 0.5 grams per hundred grams of total monomers.

Redox initiation involving an oxidant, such as potassium persulfate or potassium bromate, and a reductant, such as sodium metabisulfite, or tertiary amines, such as triethyl amine, can also be used to initiate polymerization, particularly at low temperatures.

The process of producing the graft copolymers of this invention involves contacting the olefin/CO copolymer with an initiator in the presence of monomer used to form the grafted portion of the polymer. Preferably, this is done by introducing the monomer used to form the graft into the oil phase of a dispersion of olefin/CO resin and then adding an initiator to the dispersion. A minor amount of agitation such as through stirring or mixing may be applied.

The olefin/CO dispersion to which the graft monomer is added is preferably formed by mixing the olefin/CO copolymer with water and a surfactant. Typically, the dispersion will contain more water than olefin/CO copolymer on a weight basis although, as will be readily appreciated by those skilled in the art, additional aliquots of copolymer may be added during emulsification to increase the solids content of the product ultimately formed. In glue applications, a high solids content is desired provided that viscosity can be kept low enough to easily work with the material. Solids contents up to about 60% can be achieved under these conditions using glues made from the graft copolymers of this invention.

Any surfactant capable of dispersing the olefin/CO resin in water can be used provided that the material does not interfere in the initiation of the graft copolymerization. Preferably, the surfactants are nonionic and include, for example, polyalkylene glycols generally, and polyalkylene glycol alkyl ethers, polyalkylene glycol alkyl phenyl ethers, polyalkylene glycol fatty acid esters, sorbitan fatty acid esters, alkyl polyglycoxides, fatty acid dialkanol amides, and the like. Selection of the amount of surfactant added to form the emulsion is well within the grasp of one having ordinary skill in the art. Typically, the surfactant will comprise about 3 to 15% weight of the olefin/CO copolymer used to form the emulsion but any amount which will serve the purpose of getting both copolymer and grafting monomer into an emulsion can be used.

Once the graft copolymers of this invention are prepared they can be further prepared as glues and adhesives (commonly referred to as binders) through the addition of a curing agent and, optionally, a catalyst. Binders so prepared can then be used to join together two or more materials of like or dissimilar character. For example, composites can be formed of wood parts, wood chips, veneers of different species, metals, various polymers, and other materials. Composites formed from the union of two or more wood parts are a most preferred embodiment of this invention.

The species and the form of the wood parts which are used for producing the composites are not critical. The wood may be a high or a low density wood and it may be of deciduous or coniferous origin. Examples of suitable species are oak, chestnut, ash, maple, teak, okoume, mahogany, meranti and pine. Very good results can be obtained with beech, spruce and poplar. The wood does not need any pretreatment other than which may normally be applied when a conventional binder is used. It is generally sufficient to bring the wood parts in the size and shape desired for the type of composite to be produced, for example, by applying mechanical and/or chemical means. Suitably the wood is used in the form of planks, veneers, timber, lamellae, chips or pulp. A combination of two or more species or forms of wood parts may be used, for example, to improve the appearance of the composite.

The wood may be pretreated to increase its durability. An example of such a pretreatment is treatment with superheated steam at 150–220° C. under pressure followed by heating at 100–220° C. at ambient pressure. Another pretreatment is salt impregnation with, e.g., chromium, copper, mercury, arsenic salts or combinations thereof.

Many curing agents can be used in the binder according to this invention. Suitable curing agents or curing systems are disclosed in EP-A-372602 (the disclosure of which is incorporated herein by reference) and may comprise, for example, an amine, a thiol or acrylonitril. Preferred curing agents include, for example, hexamethylenediamine (HMDA), hexamethylenediamine carbamate, tetramethylenepentamine, hexamethylenediaminecinnamaldehyde adduct, and hexamethylenediaminedibenzoate salt. Aromatic amines and cycloaliphatic amines can be used but those having bulky functional groups are not preferred. Aliphatic primary diamines having the formula $H_2N—R—NH_2$, (R denotes a bivalent aliphatic bridging group having up to 10 carbon atoms in the bridge) are preferred curing agents. HMDA is the most preferred curing agent.

It can also be advantageous to employ a mixture of curing agents. In particular a mixture of a relatively more reactive curing agent and a less reactive curing agent is useful. For example, straight chain aliphatic diamines may be used as the more reactive curing agent in combination with aromatic or cycloaliphatic poly-primary amines as the less reactive curing agent. By the presence of the more reactive curing agent a rapid gelling can be achieved once the curing has started. Upon prolonged curing the cyclic carbon skeleton of the less reactive curing agent will boost the mechanical strength of the composite at a high temperature. The molar ratio of the more reactive curing agent and the less reactive curing agent may vary between wide limits according to the requirements of the particular use of the binder. This molar ratio can be determined readily by the skilled person by applying routine experimentation. Typically the molar ratio will be about 2:98 to 98:2.

The degree of crosslinking occurring during the curing is dependent, inter alia, on the quantity of curing agent used relative to the quantity of the copolymer of carbon monoxide and olefinically unsaturated compound. The relative quantity of curing agent may vary between wide ranges and by routine experimentation a preferred relative quantity can be established. When a poly-primary-amine is used as curing agent, the molar ratio of the carbonyl groups in the copolymer and the primary amine groups of the curing agent is suitably in the range of from 0.25 to 8.0 and more suitably in the range of from 0.4 to 2.0.

The curing of the copolymer may be carried out in the presence of a curing catalyst or in the absence of any curing catalyst. Advantages of using a catalyst will generally be that the curing can be carried out at a lower temperature or during a shorter period of time. When the curing agent is an aliphatic diamine, suitable catalysts are weak acids, in particular acids having a $pK_a$ in the range of from 2 to 5.5, preferably in the range of from 2.5 to 5, when measured in water at 20° C. A preferred class of acids are the organic acids, in particular carboxylic acids, because these are at least to some extent soluble in the copolymer to be cured. Monocarboxylic acids are more preferred due to their generally better solubility in the copolymer. Examples of monocarboxylic acids are acetic acid, nicotinic acid, pivalic acid, valeric acid, benzoic acid and, salicylic acid. Another suitable weak acid is phosphoric acid. Acetic acid is the most preferred catalyst.

The weak acid may be used in small quantities. Suitable quantities are from 0.1 to 15.0% by weight relative to the weight of the copolymer. It is more preferred that the weak acid is used in a quantity of from 0.2 to 10.0% by weight. It is most preferred that from 0.5–8.0% w, on the same basis is used.

The waterborne glue compositions of this invention typically display viscosities which make them easy to work with. Typically these range between about 200 and 5000 mPa.sec at room temperature as measured in a Brookfield viscometer. However, if desirable, a diluent may be used in the curable resin composition to facilitate the application of the composition onto the wood parts. A diluent may also improve the compatibility of the curing agent and any catalyst with the copolymer. Suitable diluents are, e.g., lower alcohols, lower ketones, lower esters, such as acetates, and lower ethers. The term "lower" refers to diluents with an average of 5 or less carbon atoms per molecule. Preferred diluents are water and lower alcohols, with water being most preferred. Examples of other suitable diluents are acetone, ethyl acetate, methyl propionate and ethylene glycol dimethylether. When the curable resin composition is to be applied, for example, by spraying, the viscosity may suitably be in the range of 100 to 2000 mPa.s, preferably in the range of 500 to 1000 mPa.s, at the temperature of application. Preferably the diluent and the copolymer are used in a weight ratio of at least 1:5, in particular in the range of 1:2 to 5:1, more in particular 1:1.5 to 2:1.

It is possible to prepare the curable resin composition in the form of a paste which can easily be spread onto the wood surface in a convenient temperature range, for example, between 10° C. and 50° C. Such a paste consistency can be accomplished by applying in the binder a relatively small quantity of a diluent, such as water, a lower alcohol or a lower ketone. Typical quantities of diluent are in the range of 0.2–5.0% by weight relative to the weight of the copolymer, in particular 0.3–3.0%, more in particular 0.5–1.0% on the same basis. Very favorable results can be obtained by combining a linear alternating copolymer of carbon monoxide and an a-olefin, the copolymer having a weight average molecular weight in the range of 200 to 10,000, with water, a surfactant, a radical initiator, and a vinyl polymer. The mixture is then stirred for 15 minutes followed by the addition of a primary-amine, a weak acid, which may be used as the curing catalyst, and 0.2–5.0% by weight of a diluent, relative to the weight of the copolymer, and heating the obtained mixture at a temperature of between 30° C. and 100° C., preferably between 40° C. and 80° C. The heating time will depend on the temperature selected and may vary suitably between 5 and 50 minutes. Selection of the heating temperature which will provide an optimum consistency and quality of binder is readily obtainable on the basis of routine experimentation. The paste obtained may be applied to the wood at the temperature applied in its preparation but it may also be used at ambient temperature.

The binder may contain additional components which may be added to modify properties of the binder. Examples of suitable additional components are viscosity modifiers, flame retardants, gap filling agents, antioxidants, UV stabilizers and colorants. For example, clay may be used as a filler or it may be used to decrease the viscosity at high shear rate. A suitable gap filling agent is silica, cereal flour, or coconut shell flour. Antioxidants and UV stabilizers are particularly desirable additives when the composition formed according to this invention is used as a coating material.

The binder may be applied to the wood surface using any conventional technique. The binder, in particular the paste described hereinbefore, may be spread over the surface by using, for example, a brush, a roller, a knife or a blade. It has already been indicated that, after the addition of a suitable quantity of diluent, the binder can also be applied by spraying it by means of a nozzle driven by a compressed gas, for example, as in continuous in-line spraying or by using a paint-sprayer. If desired, when a composite having a soft hand feel is to be produced, the binder may also be applied as a coating at wood surfaces which will be positioned at the outer surface of the composite. It is also possible to coat the cured composite and to cure the coating in an additional curing step.

The quantity of binder relative to the quantity of wood may vary between wide limits and will generally be dependent of the type of composite to be produced. For wood laminates this quantity may be specified per square meter of wood surface covered by the binder or per square meter of joint present between two wood lamellae. Typically, between about 30 and 400 g of the binder per square meter of joint are used. Preferably, between about 60–120 g of binder is used.

When the wood composite is a fiber board or a particle board the quantity of binder may more conveniently be related to the weight of the composite. Per kilogram of the fiber board or particle board typically such a quantity of binder is used which is based on 20–150 g, more typically 30–100 g of the copolymer of carbon monoxide with an olefinically unsaturated compound. For special applications of fiber boards it may be desired to have the binder present as the continuous phase, in which cases per kilogram of the composite such a quantity of binder may be used which is based on 150–600 g and in particular 200–500 g of the copolymer of carbon monoxide with an olefinically unsaturated compound.

After, or simultaneously with, applying the binder onto the wood surface the wood parts are brought together, such that binder resides between wood parts, and curing conditions are subsequently applied. The temperature and the pressure may vary between wide limits. The temperature will generally be dependent of the curing agent and the presence of a curing catalyst. When a poly-primary-amine is used as curing agent the temperature will suitably be above 50° C., for example, in the range of from 80° C. to 200° C., in particular 100° C. to 160° C. For laminates typical pressures are in the range of from 1 to 30 kg/cm$^2$, preferably from 2.5 to 25 kg/cm$^2$. In fiber board and particle board applications typical pressures are in the range of from 10 to 150 kg/cm$^2$, preferably from 25 to 100 kg/cm$^2$.

Various types of wood composites can be produced according to this invention, such as fiber board, particle board, for example, wafer board, and laminate, such as plywood and laminated beam or timber. The composites have an excellent impact resistance/strength balance and in the presence of moisture they have an excellent dimensional stability. Hence, the composites can advantageously be applied in the production of doors, parquet flooring, sport articles, such as hockey sticks and electrical appliances, such as switchboards and panels for distributing boxes. Fiber boards which have the binder as the continuous phase can find utility as construction panels.

The invention will be further illustrated by means of the following nonlimiting examples. Glue formulations are as follows: A=100 parts by weight (pbw) of the Emulsion of Example 2, 25 pbw 65% HMDA, 4 pbw 20% acetic acid. B=100 pbw of the Emulsion of Example 3, 21 pbw 65% HMDA, 3.3 pbw 20% acetic acid. C=100 pbw of the Emulsion of Example 4, 25 pbw 65% HMDA, 4 pbw 20% acetic acid. D=100 pbw of the Emulsion of Example 3, 18.8 pbw 65% HMDA, 4 pbw 20% acetic acid.

EXAMPLE 1

Olefin/CO Polymer Preparation

An autoclave containing 80 parts by volume methanol, 10 parts water, and 10 parts acetic acid was heated to 95° C. and then charged with 36 bar of propene, 16 bar of C), 4 bar of ethene, and a catalyst solution comprised of palladium acetate, 1,3-bis(di-o-methoxyphenylphosphino)propane, trifluoromethanesulfonic acid in a molar ratio of 1/1.05/2.1. During the reaction, the temperature was maintained at 95° C. and the reactor pressure was kept constant by continuous feeding of a 1/1 mixture of ethene/CO. After 20 h, the reactor was cooled to room temperature and vented. The solvent was removed under reduced pressure to yield an alternating olefin/CO copolymer with a number average molecular weight of 1800 and a ethene/propene molar ratio of 28/72. The productivity of the catalyst was 36 kg of oligomer per g of Pd.

EXAMPLE 2

Preparation of a Waterborne Resin

To a resin kettle equipped with an anchor-shaped stirrer was added a mixture of 76.6 parts by weight (pbw) of a perfectly alternating copolymer as prepared in Example 1, 52 pbw of a nonionic poly(ethylene glycol) surfactant (commercially available under the tradename "23W004" by Shell Chemical Company), and 108 pbw of water. The mixture was stirred at 200 rpm and additional aliquots of the copolymer were added over a period of 2 hours until the total amount of copolymer in the mixture was 500 pbw. After further stirring at ambient temperature for 3 hours, 343 pbw of water was added over a period of 1 hour to yield an emulsion with a 55% solids content.

EXAMPLE 3

Preparation of Waterborne Olefin/CO Resin Grafted with Polystyrene

To 479 pbw of the emulsion prepared in Example 2 was added 144 pbw of water, 163 pbw of styrene and 1.45 pbw of potassium persulfate. The mixture was placed in a bottle, shaken for 15 minutes, and placed in an oven at 60° C. overnight. The product was an emulsion of olfein/CO copolymer grafted with polystyrene. The weight ratio of olefin/CO copolymer to polystyrene was 60/40 and the solid content of the emulsion was 55% by weight.

EXAMPLE 4

Preparation of Waterborne Olefin/CO Resin Grafted With Poly(methylmethacrylate A mixture of 90 pbw of the emulsion prepared according to Example 2, 29.8 pbw of methyl methacrylate, and 0.1 pbw of potassium persulfate was heated in a resin kettle with stirring at 60° C. for 6 hours. An emulsion of olefin/CO copolymer grafted with poly(methyl methacrylate) was formed. The weight ratio of olefin/CO copolymer to poly (methyl methacrylate) was 60/40 and the solid content of the emulsion was 66% wt.

EXAMPLE 5

Preparation of Plywood Panels and Performance Comparison

This example is a modified version of Plywood Specimen Test 6.1.5.3 as described in "PSI-95, Construction and Industrial Plywood", 1995 reproduced by the American Plywood Association and incorporated herein by reference.

Three-layer (nonnotched) crossply wood panels were prepared from ⅙" southern pine veneers using three different waterborne glue forumlations prepared by mixing the emulsions obtained in Examples 2, 3, and 4 respectively, with hexamethylenediamine (HMDA) and acetic acid. The panels were hot pressed at 200° C. and 200 psig. The dosage used for all panels was 65 g of solid/$m^2$ per glue line. To evaluate water resistance, 1"×3" specimens were cut from the panels, soaked in boiling water for 4 hours, dried in an oven at 63° C. for 23 hours, and immersed in water for 4 hours. Glue performance was rated according to the number of specimens which did not delaminate after the 2-cycle boil test for a given hot press time.

Results are listed in Table 1 below.

TABLE 1

| Glue Formulation | Press Time at 200° C. (Number of Plywood Test Specimens Surviving After Boil Test) | | |
|---|---|---|---|
| | 4.5 min | 6 min | 10 min |
| A | 0 | 0 | 3 of 5 |
| B | 0 | 3 of 3 | 3 of 3 |
| C | 2 of 3 | 3 of 3 | 3 of 3 |

This example illustrates the superior wood bonding that is attainable through use of glues made according to this invention. Specimen A employed a glue comprised of olefin/CO polymer which was not graft copolymerized. Specimens B and C were glues made according to the instant invention. Glued samples employing the nongrafted polymer as the glue required a 10 min hot press time to survive the boil test. Glued samples using glues made according to this invention survived boil with a 6 min (or less) hot press time.

EXAMPLE 6

Preparation and Performance of Flake Boards

This example is a modified version of Plywood Specimen Test 5.4.1 as described in "0437 Series 93 Standards on OSB and Waferboard",1993, published by the Canadian Standards Association and incorporated herein by reference.

Randomly oriented strand board panels (18"×20"×7⁄16") were prepared from southern pine wood flakes by spraying the flakes with a 51% nonvolatile wax (a 15 cpp provided by Borden) emulsion and a waterborne glue, successively in a rotating drum. Spraying was conducted with an atomizing sprayer (Concord High Precision Atomizer made by Coil Industries, Ltd). The amounts of wax and glue applied were 1 and 4% solid relative to the weight of wood, respectively. The panels were hot pressed at 200° C. for 4.5 minutes and the press pressure was 800 psig for the first 1.5 minutes and 400 psig for the remainder of the press cycle. Results are presented in Table 2 below. Modulus of rupture, modulus of elasticity, and internal bond were measured according to ASTM D 1037 using an Instron instrument.

TABLE 2

| Glue Formulation | Internal Bond (psi) | Modulus of Rupture (psi) | Modulus of Elasticity (psi) |
|---|---|---|---|
| A | 60 | 2732 | 430 |
| D | 106 | 3792 | 531 |

The Canadian Standards Association requirements are an Internal Bond of 50 psi, a Modulus of Rupture of 2500 psi, and a Modulus of Elasticity of 450 psi. This example illustrates the excellent wood bonding properties of glues made according to this invention. The particle board made with glue according to the invention (D) greatly exceeded the standards set by the Canadian Standards Association.

I claim as my invention:

1. A composition comprising an alternating aliphatic polymer of aliphatic olefins and carbon monoxide monomers having a number average molecular weight between about 500 and 5000 and grafted thereto, polymers of vinyl monomers wherein said alternating aliphatic polymer is comprised of about 50% mole units owing their origin to CO monomer and about 50% mole units owing their origin to olefinic monomer and wherein at least about 30% by weight of said olefinic monomer are $C_3$ or higher.

2. The composition of claim 1 wherein said olefins comprise ethene and propene.

3. The composition of claim 2 wherein propene comprises at least 20% wt of the olefins of said alternating aliphatic polymer of aliphatic olefins and carbon monoxide.

4. The composition of claim 1 wherein the copolymer has a number average molecular weight in the range of from 1000 to 3000.

5. A curable resin comprising the composition of claim 1 in water and having a viscosity between about 200 and 8000 mPa.s.

6. The curable resin of claim 5 further comprising a surfactant.

7. The curable resin of claim 6 wherein the surfactant is nonionic.

8. The curable resin of claim 7 wherein the surfactant is a block polymer of poly(ethylene glycol).

9. A method of making a curable resin comprising:

(a) dispersing an olefin/CO copolymer having a number average molecular weight between about 500 and 5000 in water to form an olefin/CO copolymer dispersion, and (b) adding an initiator and a monomer to said dispersion to form a graft copolymer.

10. The method of claim 9 wherein the initiator is a radical initiator and said monomer is a vinyl monomer.

* * * * *